US008082945B1

(12) United States Patent
White et al.

(10) Patent No.: US 8,082,945 B1
(45) Date of Patent: Dec. 27, 2011

(54) TOP OPERATING TELESCOPING ADJUSTABLE VALVE BOX AND VALVE STEM ASSEMBLY

(75) Inventors: Dennis Wayne White, Cedar Falls, IA (US); John Leonard Jacobs, Earlham, IA (US)

(73) Assignee: E-Z Innovations, L.L.C., Cedar Falls, IA (US)

( * ) Notice: Subject to any disclaimer, the term of this patent is extended or adjusted under 35 U.S.C. 154(b) by 338 days.

(21) Appl. No.: 12/571,818

(22) Filed: Oct. 1, 2009

Related U.S. Application Data

(60) Provisional application No. 61/102,035, filed on Oct. 2, 2008.

(51) Int. Cl.
*F16K 51/00* (2006.01)
(52) U.S. Cl. .................... 137/369; 137/370; 251/293
(58) Field of Classification Search .......... 251/291–293; 137/363–372
See application file for complete search history.

(56) References Cited

U.S. PATENT DOCUMENTS

| 307,753 | A | | 11/1884 | Earle |
|---|---|---|---|---|
| 380,308 | A | | 4/1888 | Barry, Jr. |
| 407,955 | A | | 7/1889 | Kallaher |
| 413,714 | A | | 10/1889 | Freeman |
| 618,753 | A | * | 1/1899 | Ward et al. .................... 137/293 |
| 667,265 | A | | 2/1901 | Tyler |
| 606,886 | A | | 12/1908 | Jacob |
| 948,001 | A | | 2/1910 | Tyler |
| 961,178 | A | | 6/1910 | Tyler |
| 996,956 | A | | 7/1911 | Walcott |
| 997,412 | A | | 7/1911 | Paradine |
| 1,004,436 | A | | 9/1911 | Kehr, Sr. |
| 1,325,393 | A | | 12/1919 | Calhoun |
| 2,431,527 | A | * | 11/1947 | Walters .................... 137/343 |
| 2,827,914 | A | | 3/1958 | Alters |
| 3,537,471 | A | | 11/1970 | Houle |
| 3,601,143 | A | | 8/1971 | Glennon |
| 3,658,086 | A | * | 4/1972 | Hart .................... 137/368 |
| 3,693,647 | A | | 9/1972 | Saar |
| 3,797,518 | A | | 3/1974 | Holm |
| 4,064,902 | A | | 12/1977 | Swenson |
| 4,239,056 | A | | 12/1980 | Shope |
| 4,308,886 | A | | 1/1982 | Handley |
| 4,497,340 | A | | 2/1985 | Gain, Jr. |

(Continued)

OTHER PUBLICATIONS

American Flow Control, Trench Adapter and Retrofit Valve Box Insert TARVBI1 Specification sheets.

*Primary Examiner* — John Bastianelli
(74) *Attorney, Agent, or Firm* — James C. Nemmers; Shuttleworth & Ingersoll, PLC

(57) ABSTRACT

A top operating telescoping adjustable valve box and valve stem assembly that incorporates a telescoping valve stem actuating system which, when coupled to a service valve, allows for the operation from ground level without the removal of a plug or lid. The system has a large range of vertical adjustability. The upper and lower sections of the assembly are in frictional connection with each other, which allows no transmittal of force to the lower section when any upward force to the upper section is applied, thus reducing damage to the buried valve and pipeline. The assembly provides a tracing block terminal, located on the top base, to allow for the connection of tracing wire from the valve top to the service pipe for service line location. The assembly also incorporates the placement of a tamper proof cap for the prevention of unauthorized operation of valve stem system.

9 Claims, 6 Drawing Sheets

U.S. PATENT DOCUMENTS

| | | |
|---|---|---|
| 4,655,160 A | 4/1987 | Ligh |
| 4,702,275 A * | 10/1987 | Ballun et al. .................. 137/556 |
| 5,220,942 A | 6/1993 | Garvin, Jr. |
| 5,327,925 A | 7/1994 | Ortel |
| 5,555,998 A | 9/1996 | Coppola |
| 5,634,488 A | 6/1997 | Martin, Jr. |
| 5,738,140 A | 4/1998 | Mann |
| 5,803,125 A | 9/1998 | Bliss |
| 5,950,654 A | 9/1999 | Paylor |
| 7,021,327 B2 * | 4/2006 | Creel ............................ 137/291 |

* cited by examiner

TOP OPERATING TELESCOPING ADJUSTABLE VALVE BOX AND VALVE STEM ASSEMBLY

This application claims priority under 35 USC 119 to Provisional Patent Application Ser. No. 61/102,035 filed on Oct. 2, 2008, the contents of which are hereby incorporated by reference.

BACKGROUND OF THE INVENTION

1. Field of the Invention

This invention relates to a valve or curb service box assembly for buried service valves (Minneapolis pattern), operated from ground level.

2. Description of Related Art

Current valve or curb service boxes connect to service valves buried below ground level. These valves control the flow through a buried pipeline connected to the valve. Access to the buried valve is by means of a conduit or soil pipe used to accept a wrench of sufficient length to extend down through the pipe for the coupling of the wrench to the valve nut, and then turned to operate the valve for an open or closed effect. Some valves or curb service boxes have an extension rod already coupled to the valve nut which rod extends a short distance upwards inside the service box. This allows for the actuation of the valve in the same manner as those using a long wrench but allows the use of a similar, but shorter type of wrench. Both of these known service boxes require the removal of a plug or cap from the top of the service box and the lowering of a wrench into the conduit or soil pipe to connect to the valve nut. This method can prove to be difficult if debris has entered the conduit or soil pipe and does not allow the wrench to extend to the valve nut. Broken or removed plugs and tops allow foreign material, such as debris, water, rocks, etc, to enter the conduit or soil pipe passage and restrict the entrance and connection of the wrench to the valve nut. With service boxes of this type, unauthorized persons may remove the plug or top and actuate the valve nut and replace the plug or top, and the controlling authority would not be aware of the action taken.

Currently known telescoping curb service boxes have an approximate adjustment length of one (1) foot vertically. Any upward force applied to the top of the curb box, after installation, may result in damage to the service box, buried valve, and piping. This can cause installation difficulty for the buried pipe and valve when trying to maintain proper expansion depth, as top ground conditions change. The need to obtain different length of curb service box systems to accomplish any given installation is currently the standard.

In addition, locating a service line can prove to be virtually impossible if no tracing system has been installed, and the design of currently known boxes does not provide for any practical or effective means of locating the service line.

There is therefore a need for an improved valve or curb service box assembly for buried service valves which are operated from ground level to correct the above noted deficiencies of existing curb service box assemblies.

SUMMARY OF THE INVENTION

The curb service box assembly of the present invention incorporates features to improve effectiveness over currently known assemblies in use. The assembly of the invention also provides top ground actuation of a Minneapolis pattern valve, allowing a pentagon key system to operate from the top of the unit at ground level. The key connects to an upper square stainless steel stem tube that extends down to a larger square stainless steel stem tube. A valve receiver adapter inserts into the bottom of the lower square stainless steel stem tube. The valve receiver connects to a buried, Minneapolis style, curb stop valve by means of a fastener, such as a cotter pin. The curb stop valve is actuated by turning the AWWA #1 pentagon, located on top of unit, which actuates the nut head on the curb stop valve. Both upper and lower sections of the square stainless steel stem tubes are housed inside of the upper and lower section of the outer PVC barrel pipe. The upper and lower sections of the PVC barrel pipe thus act as a conduit for the upper and lower sections of square stainless steel stem tubes. The upper and lower barrel sections and the square stainless steel stem tubes telescope simultaneously with each other, allowing for a large range of vertical adjustability.

The vertical adjustability, along with the simultaneous telescoping capability, allows for a free-floating unit between the upper and lower sections of the valve box unit. The free-floating nature of this invention allows the upper section to separate from the bottom section when an upward force is applied. The separation occurs at midpoint of the valve box unit without damaging the lower section of the valve box unit, buried valve, or buried piping.

The housing for the pentagon key is the center of the valve box top. The pentagon key is a separate unit of casted metal. The pentagon design is that of the AWWA #1 style, used on current curb box systems. Traditionally, the AWWA #1 pentagon design appears on bolts and plugs used to gain access to the curb stop valve. This invention utilizes the pentagon key design as the nut for the pentagon valve system. A common pentagon wrench, when placed on the pentagon of the key and turned clockwise or counter-clockwise, actuates the valve stem system's valve receiver coupled on the curb stop valve.

Additional features of the invention include a tracer block terminal for the use of pipe location and a tamper proof cap used to prevent unauthorized operation of the buried valve operating stem assembly. The top base of the valve box system has a round casted metal top with two protruding wings, located on opposite sides of each other. The wings are situated on the underneath side of the metal top. A tracer block terminal attaches to one wing. The tracer block terminal allows for the attachment of tracing wire from the service pipeline to the valve box top base. This provides the ability to locate the service pipeline, whether the pipe used is conductive or non-conductive. No additional devices are required to accommodate the use of tracing wire.

A center positioned machined ledge on the top base accepts an optional tamper-proof cap. The cap is a round metal disk, and when inserted into the machined ledge, prevents unauthorized activation of the pentagon key. The cap is a one-time use part of the valve box system, due to the need to puncture and damage the cap for removal. The valve box top base design accepts replacement caps, as needed.

BRIEF DESCRIPTION OF THE DRAWINGS

The features of the present invention and its intended advantages are apparent to those having ordinary skill in the art and will be more easily understood from the preferred system in conjunction with the accompanying drawings wherein like reference characters represent like parts throughout the different views of the present invention.

DESCRIPTION OF THE PREFERRED EMBODIMENTS

Figure 1:
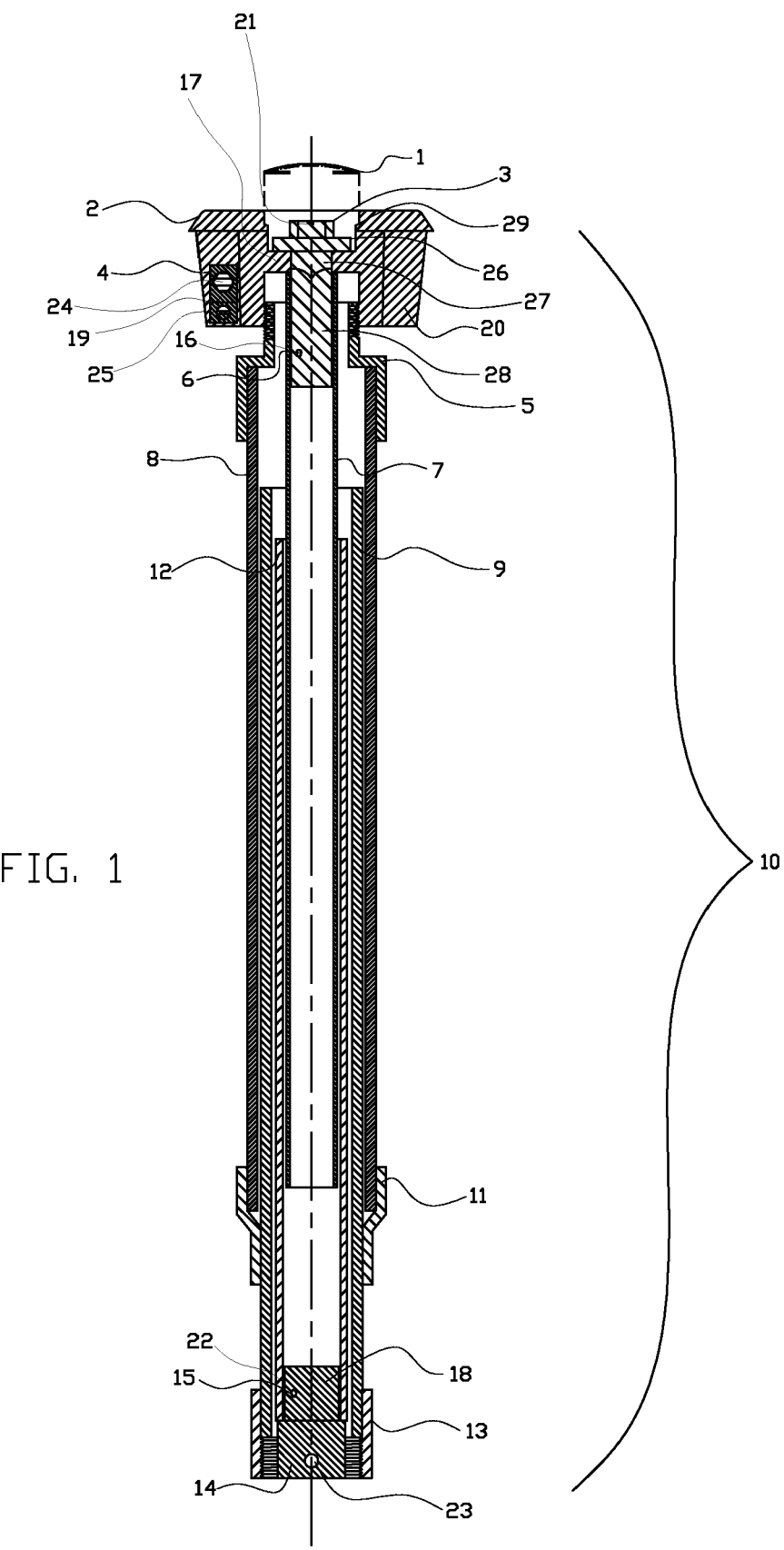
FIG. 1 is a cross-sectional side view of the entire top operating telescoping adjustable valve box and telescoping valve stem assembly of the present invention.

Referring initially to FIG. 1, shown in cross-section, is the top operating telescoping adjustable valve box and telescoping valve stem assembly, indicated generally at 10, of the preferred embodiment of the invention.

One feature of the preferred embodiment of the invention utilizes a means of actuating from ground level a buried Minneapolis pattern service valve. Such valves serve water service lines extending from the service valve connection to an end point (i.e. building or structure). The Minneapolis pattern valve is not shown, but such valves are well known and common in the industry and have mechanical pipe threads atop the valve body, which allows connection of the Minneapolis pattern valve to the service curb box.

The top base 2 of the assembly 10 is of casted metal with two side tab wings 20 180° apart located on the underneath side of the round top of base 2. As shown in FIG. 1, the top base 2 has a machined hole in the center for the acceptance of the pentagon key 3, which inserts into the hole and rests on the landing 17 of the top base 2.

Figure 3A:
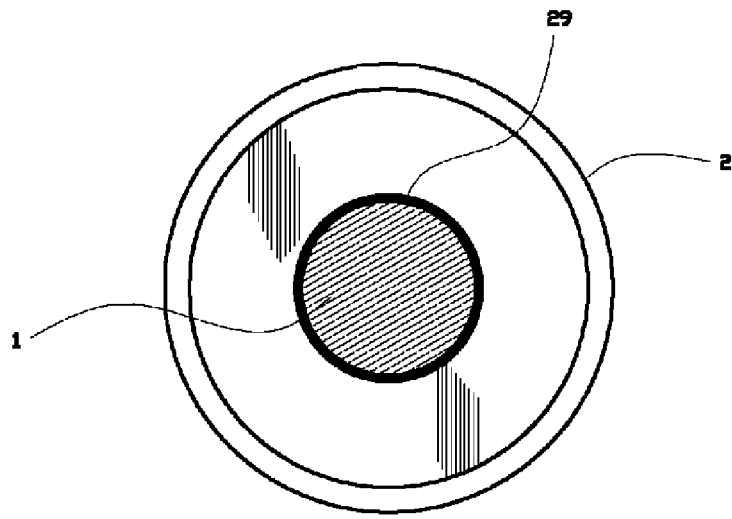
FIG. 3A is a view of the top base with the tamper-proof cap installed.
Figure 3B:
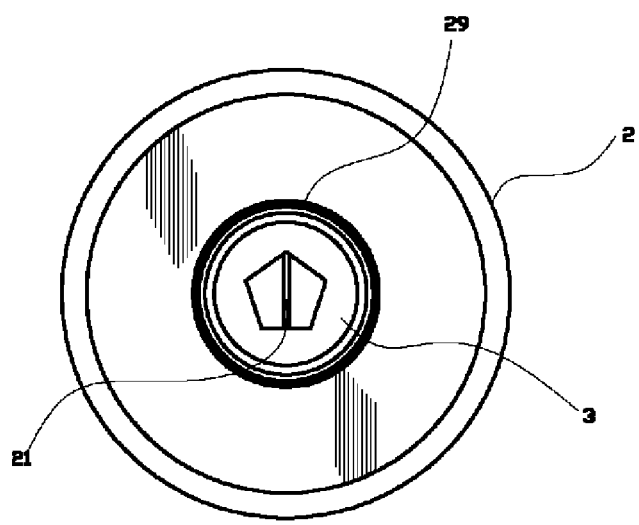
FIG. 3B is a view of the top base without the tamper-proof cap installed. This view also shows the pentagon key top with indicator groove in center of pentagon.
Figure 4A:
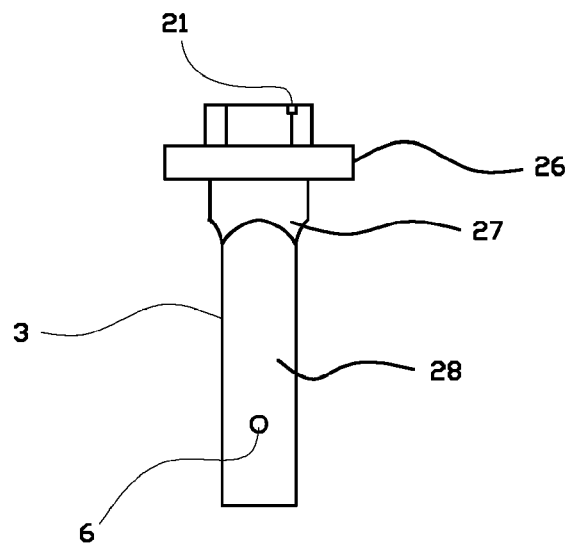
FIG. 4A is a side view of the pentagon key denoting the hole near the bottom of the pentagon key shaft.
Figure 4B:
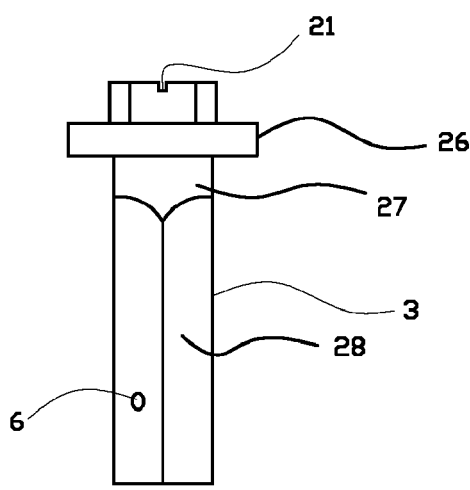
FIG. 4B is the same side view as FIG. 4A rotated 22.5°, showing a flat side without hole. This view also displays the indicator groove at top of pentagon key.
Figure 4C:
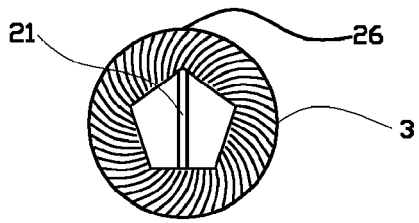
FIG. 4C provides a top view of the pentagon key.

As best seen in FIGS. 4A and 4B, the pentagon key 3 has the appearance of a bolt inserted into a washer with the AWWA #1 pentagon atop the bolt. The use of the AWWA #1 pentagon shape is by design for the use of common types of wrenches or sockets used in the water service curb box industry. In the center of the pentagon key 3 top is a straight groove 21 cut into the pentagon top that extends from the point of the pentagon to the opposite straight side of the pentagon. This is illustrated in FIG. 3B and FIG. 4C showing the pentagon groove 21.

Figure 5A:
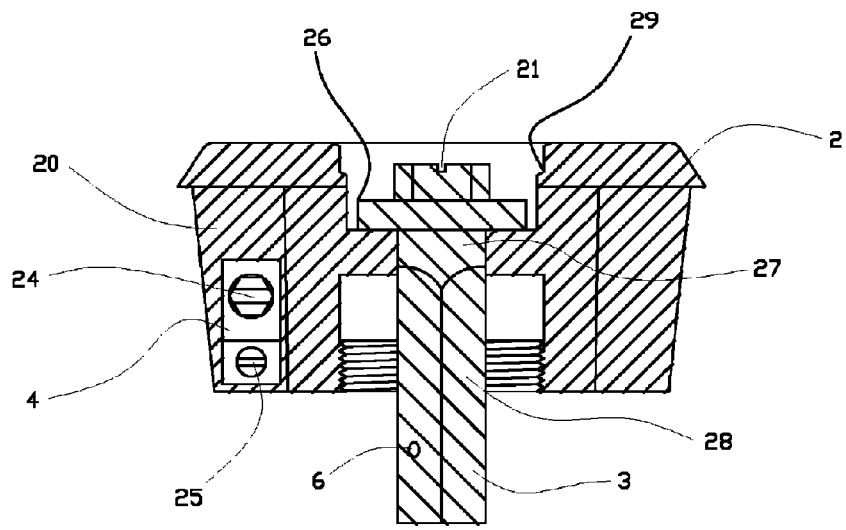
FIG. 5A is a cross-section of the top base with the pentagon key inserted in top base.

When the pentagon key 3 in inserted into the top base 2 center hole, the round protruding washer-type segment 26 of the pentagon key 3 rests on the landing 17 of the top base 2 and is illustrated in FIG. 5A allowing it to rotate freely in the center of the top base 2. On the underneath side of the washer-type pentagon segment 26 of the pentagon key 3, a round portion segment 27 fits into the center hole of the top base 2 and is maintained round throughout the thickness of the landing 17 of the top base 2. The remaining bottom portion 28 of the pentagon key 3 is square. Near the bottom of the square segment 28 is a hole 6 as illustrated in FIG. 4A and FIG. 4B.

Figure 2:
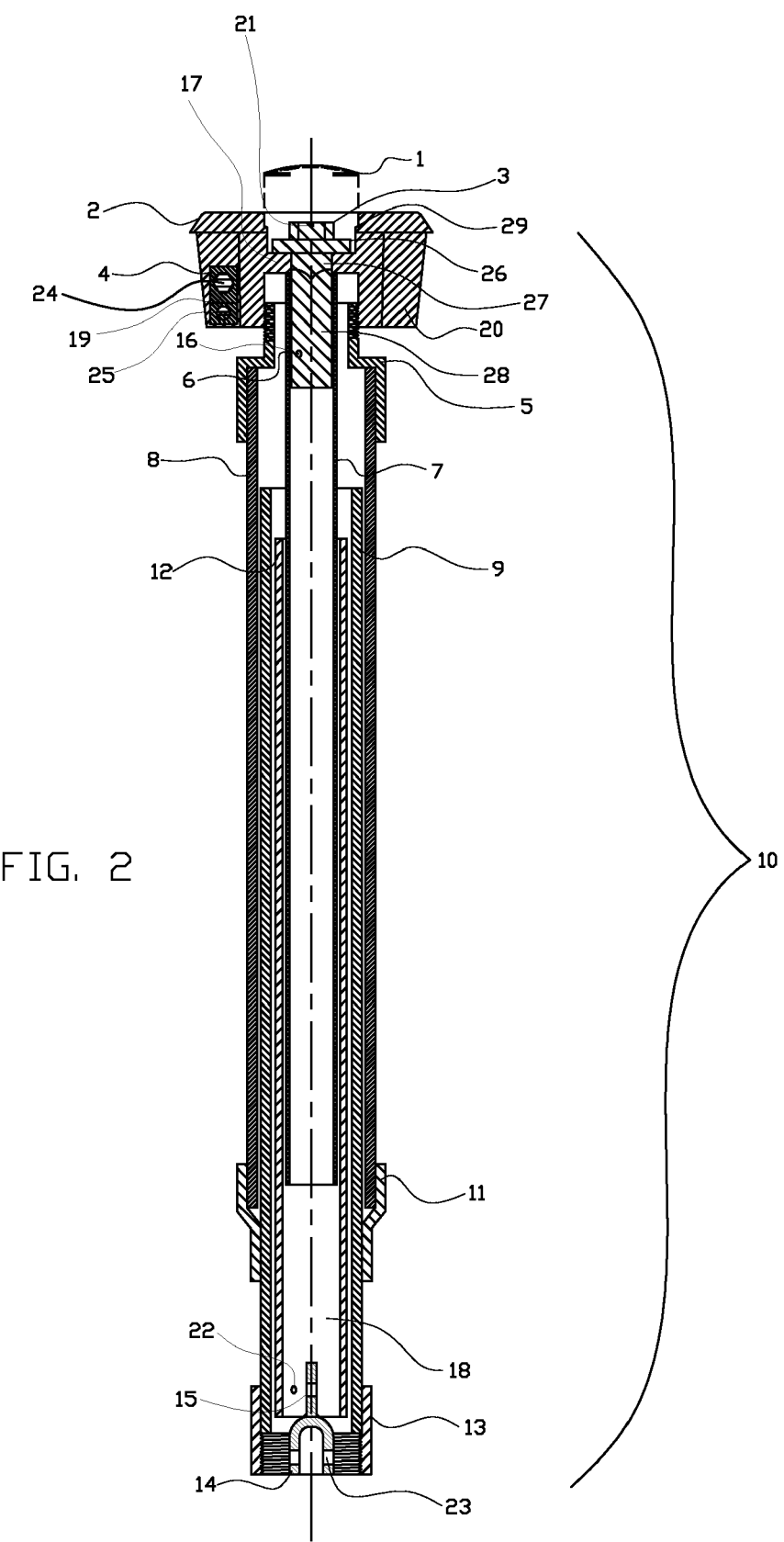
FIG. 2 is the same cross-sectional side view as denoted in FIG. 1, with the bottom valve receiver and stem assembly shown 90° turned.

Referring now to FIGS. 1 and 2, upper stainless steel valve stem 7 is a rectangular, preferably square, hollow tube. The upper valve stem 7 terminates at the bottom of the landing 17 on the top base 2 because the valve stem 7 is larger in diameter than the hole in the landing 17 through which the pentagon key 3 extends. The upper valve stem 7 fits over the square segment 28 of the pentagon key 3, and the hole 6 in the pentagon key 3 aligns with a hole 16 formed in the upper valve stem 7. A removable fastener such as a cotter pin or bolt/nut assembly (not shown) extends through the holes 6 and 16 to connect pentagon key 3 to the upper valve stem 7, preventing removal of the pentagon key 3 from the top of the top base 2. Rotation of the pentagon key 3 with a suitable wrench, provides for rotation of the upper valve stem 7 as the pentagon key 3 turns on the landing 17 of the top base 2.

The upper valve stem 7 extends downwardly and is positioned in a hollow square tube that is the lower stainless steel valve stem 12. The lower valve stem 12 is a larger square tube than the upper valve stem 7 so that the upper valve stem 7 and lower valve stem 12 telescope within each other and are free-floating. Because the upper valve stem 7 and lower valve stem 12 are square, they are turnable together. No other securing device is required for the frictional alignment of the upper valve stem 7 to the lower valve stem 12.

The bottom end of the lower valve stem 12 accepts a stainless steel valve receiver 14 via a stainless steel valve receiver tab 18. As best seen in FIGS. 1 and 2, the valve receiver tab 18 is positioned on top of and is welded to a U-shaped stainless steel portion of the valve receiver 14. FIG. 1 is a side view in section of the valve receiver 14. The valve receiver tab 18 is received in the bottom end of the lower valve stem 12 in a diagonal position and extends from one corner of the square tube of the lower valve stem 12 to the opposite corner of the valve stem 12.

The lower barrel 9 has a valve stop receiver 13 connected to the lower end of the lower barrel 9. The valve stop receiver 13 is typically made of PVC material, and the lower barrel 9 is solvent welded to the valve stop receiver 13. As illustrated in FIGS. 1 and 2, internal mechanical pipe threads are formed at the bottom of the valve stop receiver 13. As is well known, Minneapolis pattern curb stop valves have external mechanical pipe threads on the top of the valve body. The valve stop receiver 13 screws onto the Minneapolis pattern curb stop valve at the external mechanical pipe thread junction, thus securing the Minneapolis pattern valve to the lower barrel 9.

The upper barrel 8 and lower barrel 9 provide a conduit for the upper valve stem 7 and lower valve stem 12. The valve receiver 14 connects to the Minneapolis pattern curb stop valve actuating-nut (not shown). In use, the valve receiver 14 is first connected to the Minneapolis pattern curb stop actuating-nut. Second, the lower barrel 9 and valve stop receiver 13 are screwed onto the Minneapolis pattern curb stop valve mechanical pipe threads.

A hole 15 is formed in the lower valve stem 12 and is aligned with a hole 22 in the valve receiver tab 18. A removable fastener such as a cotter pin or bolt/nut assembly (not shown) connects the two units together. The fastener prevents the valve receiver 14 from sliding out of the lower valve stem 12.

The U-shaped portion of the valve receiver 14 fits over the well known Minneapolis pattern curb stop valve-actuating nut (not shown). The actuating nut accepts the U-shaped portion of the valve receiver 14, which has a hole 23 to receive a fastener, such as a cotter pin or bolt/nut assembly (not shown), so as to connect the valve receiver 14 to the curb stop actuation nut which will allow the curb stop valve to be opened and closed. Thus, turning the pentagon key 3 on the top base 2 will turn the upper valve stem 7, which will turn the lower valve stem 12, which will turn the valve receiver 14 which turns the curb stop valve actuating-nut to open or close the service valve. This feature of the present invention differs from other known systems where there is a need to remove a plug or lid from the curb box top in order to gain access to the valve nut or rod system. Then, a long wrench must be moved downwardly to the curb box housing to engage the valve nut in order to open or close the service valve.

Figure 6A:
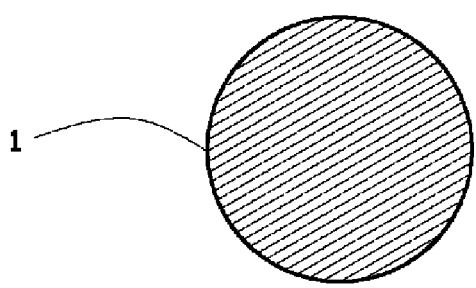
FIG. 6A is a top view of the tamper-proof cap.
Figure 6B:
FIG. 6B is a cross-section of the tamper-proof cap.

The top base 2 has a machined round ledge 29 in the top center section. The ledge 29 provides for placement of an optional tamper-proof cap 1 which is a round metal disk. FIGS. 6A and 6B illustrate the tamper-proof cap 1. The tamper-proof cap 1 inserts in the top center of the top base 2, covering the pentagon key 3, which prevents unauthorized operation of the pentagon key 3. The tamper-proof cap 1, placed above the center hole of top base 2, when hammered down, rests on the machined ledge 29 of the top base 2 and locks into place. The tamper-proof cap 1 is dome-shaped, as illustrated in FIG. 6B. When striking the top of the dome tamper-proof cap 1, the cap flattens and locks against the sides of the machined ledge 29. The only way to remove the tamper-proof cap 1 is to puncture the tamper-proof cap 1 with a sharp tool, pry it upward, and out. This action will render the tamper-proof cap destroyed and non-reusable. Replacement tamper-proof caps 1 are available for replacement, as needed. Tamper-proof caps minimize unauthorized operation of the valve stem assembly by allowing for verification of tampering with the system. Current curb box systems allow the removal of a plug or top from the service box for access to the service valve, but the plug or top, when replaced after tampering, does not provide visual evidence of tampering. Thus, governing authorities cannot know when tampering occurs. The tamper-proof caps of the invention provide for quick visual verification if tampering has occurred. FIG. 3A illustrates the top base 2 with the tamper-proof cap 1 in position.

As previously stated, the pentagon key 3 has an indicator groove 21 on top of the AWWA #1 pentagon. Further illustrations of the indicator groove 21 appear in FIG. 4B and FIG. 4C. The indicator groove 21 provides visual confirmation of the position of the Minneapolis pattern curb stop valve nut. The indicator groove 21 and the valve receiver 14, when installed correctly, assure proper alignment and curb stop valve nut position. Thus, the present invention provides a quick visual indicator of curb stop valve position. Currently known systems require removal of a plug or top, the placing of a wrench down the curb box system housing to couple with the valve nut in order to determine the open or closed position of the curb stop valve nut.

Figure 5B:
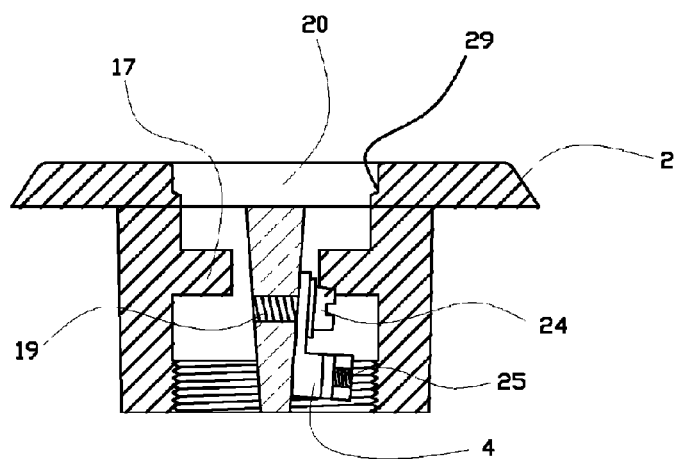
FIG. 5B is a cross-section of the top base rotated 90°, exposing the end view of one of the wings of the top base depicting the attached tracer block. This view also depicts the internal cavity of the top base. (Note: This view does not show the pentagon key in place.)

As best seen in FIGS. 5A and 5B, the top base 2 has two wings 20 180° apart. The wings 20 act as stabilizers for the top base 2, preventing the top base 2 from rotating in the ground. Rotating can occur when the ground expands and contracts. A tracer block terminal 4 is attached to one wing 20 by a stainless steel screw 24. The steel screw 24 inserts through the tracer block terminal 4 into a hole 19 of the wing 20. FIG. 5B illustrates a side-end view of the wing 20 on the top base 2 with tracer block terminal 4 attached to wing 20 with the stainless steel screw 24.

The tracer block terminal 4 accepts optional tracing wire (not shown) to be connected to the top base 2, by placing and tightening one end of the tracing wire into wire receiver hole located on the bottom of the tracer block terminal 4 with a wire screw 25. Screw 25 compresses against the receiver hole and tracing wire, making the connection between the tracing wire and the top base 2.

The ability to trace non-conductible pipe service lines is achieved when the tracing wire is connected to the tracer block terminal 4 and the service line piping, either non-conductible or conductible. Current curb box systems do not have tracer block terminals 4. Therefore, common practice in the industry today, leaves an exposed wire protruding out of the ground next to the curb box top. With the assembly of the invention, a line locating tracer unit can be clamped on the top base 2 allowing the transmission of a signal directly to the tracer wire installed through the tracer block terminal 4.

To complete the assembly of the invention, the top base 2 is connected to the upper barrel 8 with a PVC transition coupler 5. The PVC transition coupler 5 has external mechanical pipe threads that engage internal mechanical pipe threads at the bottom of the top base 2. The PVC transition coupler 5 is then screwed into the bottom of the top base 2 thus providing for connection of the top base 2 to the upper barrel 8. The upper barrel 8 is preferably Schedule 40 PVC pipe. Schedule 40 PVC pipe is injection molded and has a uniform diameter throughout it's length. Schedule 40 PVC is generally bonded to PVC couplings, fittings, and pipe with a conventional solvent welding process (glue). The upper barrel 8 can therefore be solvent welded to the PVC transition coupler 5.

The upper barrel 8 extends into an alignment guide 11 which is attached to the bottom of the upper barrel 8. The alignment guide 11 is preferably pressed onto the bottom of the upper barrel 8, not solvent welded. This provides a tight fit with the upper barrel 8, and tapping on the edges of the alignment guide 11 with a hammer or tool will allow the alignment guide 11 to be removed from the upper barrel 8. This will allow the upper section and the lower section of the barrel assembly to be separated for field cutting to a shorter length, after which the alignment guide 11 can be reinstalled on the upper barrel 8 and the upper and lower sections rejoined, making a shorter complete operational system.

The lower barrel 9 is also preferably Schedule 40 PVC pipe. The lower barrel 9 is smaller in diameter than the upper barrel 8. The lower barrel 9 slides into the bottom of the alignment guide 11. The internal surface of the alignment guide 11 is machined to a desired inside diameter for the acceptance of the outside diameter of the lower barrel 9. The machining of the alignment guide 11 allows the lower barrel 9 to slide freely in and out of the upper barrel 8. This action provides for a free-floating telescoping section. When combined with the upper valve stem 7 and the lower valve stem 12, the assembly provides a completely free-floating telescoping system. The assembly of the invention can double in length from it's collapsed form (short length) without separation This provides a wide-range of adjustability during installation. The free-floating capability allows for self-adjustment during ground expansion and contraction, due to climate changes.

The free-floating capability occurs due to the frictional connection at midpoint of the upper and lower sections of the assembly. The upper section is comprised of the tamper proof cap 1, top base 2, pentagon key 3, tracer terminal block 4, PVC transition coupler 5, upper valve stem 7, upper barrel 8, and the alignment guide 11. The lower section is comprised of the lower valve stem 12, lower barrel 9, valve stop receiver 13, and the valve receiver 14. When pulling pressure occurs, the upper section can be pulled upward and out from the lower section. This allows the upper section to pull apart at midpoint without transmission of force down to the lower section, which could cause damage to the lower section, curb stop valve, or service line. Thus, in the event of the accidental removal or hooking of the top base 2 that could dislodge or pull the upper section of the assembly out of the ground, the assembly of the invention allows this to occur without damage or disruption to the lower section of the assembly, curb stop valve, or service line. Moreover, if this occurs, the upper section can be reinstalled, resulting in a complete operational system. Skilled persons in the art of curb box installation will be able to easily install, adjust, and operate the present invention.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A top operating telescoping adjustable valve box and valve stem assembly for coupling to an underground pipeline having a service valve that opens and closes the pipeline, said assembly comprising:
    an upper section comprised of:
        a top base for placement above ground;
        a turnable key combined with the top base;
        a transition coupler combined with the top base;
        an upper barrel having an upper end and a lower end, the upper end being combined with the transition coupler;
        an alignment guide combined with the lower end of the upper barrel;
        an upper valve stem positioned inside the upper barrel and having an upper end and a lower end, the upper end being connected to the turnable key; and
    a lower section comprised of:
        a valve stop receiver combined with the service valve of the underground pipeline;
        a lower barrel combined with the alignment guide and having an upper end and a lower end, the lower end being combined with the valve stop receiver and the upper end being telescopically combined with the lower end of the upper barrel so as to be movable relative to the upper barrel;
        a valve receiver being adapted to operate the service valve of the underground pipeline to open and close the service valve;
        a lower valve stem positioned inside the lower barrel and having an upper end and a lower end, the lower end being operatively combined with the valve receiver and the upper end being telescopically combined with the lower end of the upper valve stem as to be movable relative to the upper valve stem;
        the lower valve stem being operatively connected to the upper valve stem so as to be turnable with the upper valve stem;
    whereby turning of the turnable key on the top base will turn the service valve and whereby the upper section and lower section of the assembly are vertically adjustable and are free-floating relative to each other.

2. The assembly of claim 1 in which the upper and lower valve stems are hollow rectangular tubes.

3. The assembly of claim 2 in which the valve receiver has a valve receiver tab that is positioned inside the lower end of the lower valve stem, the valve receiver tab being positioned diagonally inside the lower valve stem from one corner to the opposite corner so as to be turnable with the lower valve stem.

4. The assembly of claim 1 in which the top base has a vertically extending opening, the turnable key has an upper round portion turnable in the said opening and a lower rectangular portion extending beneath the opening into the upper valve stem.

5. The assembly of claim 4 in which the turnable key has a pentagon nut located above the vertically extending opening in the top base.

6. The assembly of claim 5 in which the pentagon nut has a groove, the groove indicating the open or closed position of the service valve.

7. The assembly of claim 1 in which the top base has a ledge surrounding the turnable key, and a tamper-proof cap is positioned on the ledge and covers the turnable key.

8. The assembly of claim 1 in which the valve receiver is adapted to accept a Minneapolis pattern curb stop valve.

9. The assembly of claim 1 in which the top base has a terminal block adapted to receive a tracing wire from the service valve to the top base to assist in locating the pipeline.

* * * * *